Oct. 31, 1933.  C. H. MICKELSEN ET AL  1,933,482
RESTRAINING DEVICE
Filed Jan. 25, 1933
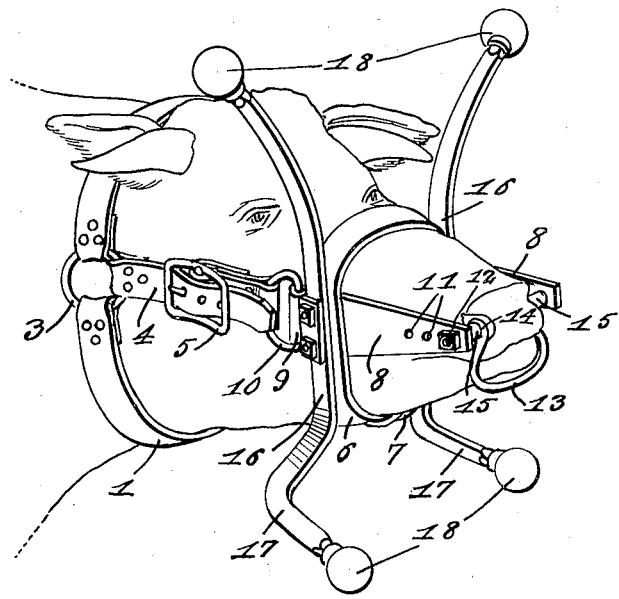
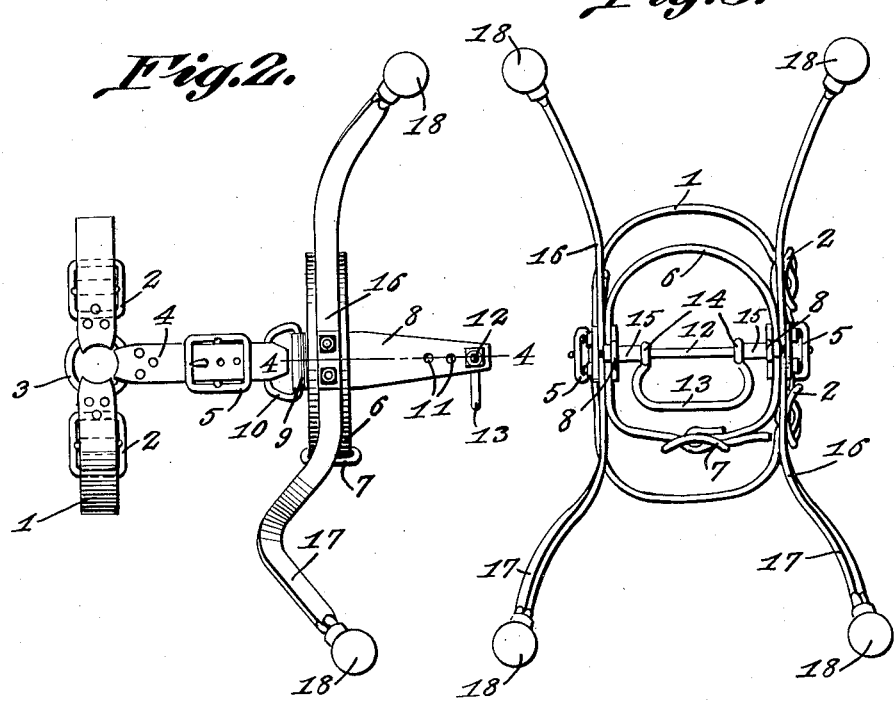

UNITED STATES PATENT OFFICE 1,933,482

RESTRAINING DEVICE

Canute H. Mickelsen, Tetonia, and Joseph T. Evans, Boise, Idaho

Application January 25, 1933
Serial No. 653,399½

3 Claims. (Cl. 119—141)

This invention relates to restraining devices for unruly animals, such as bulls, and its general object is to provide a restraining device that is capable of performing the function of a poke as well as a halter and will render the animal docile in that it can be readily managed by the use of our device.

A further object of the invention is to provide a restraining device that is simple in construction, reasonably easy to apply, cannot become casually removed, is inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which:—

Figure 1 is a perspective view illustrating the application of our device to an animal.

Figure 2 is a side elevation of the device.

Figure 3 is a front view thereof.

Figure 4 is a sectional view taken approximately on line 4—4 of Figure 2.

Referring to the drawing in detail, the reference numeral 1 indicates the neckband of our device, and the neckband includes straps of leather or like material, and buckles which are indicated by the reference numeral 2 whereby the neckband can be adjustably associated with the neck of an animal as shown in Figure 1.

The neckband likewise includes rings 3, there being a ring upon opposite sides of the band and secured to the rings and extending forwardly therefrom are the rear ends of side strap members 4 that likewise includes buckles 5 for adjusting the length thereof as will be apparent.

The nose and chin band of our device is indicated by the reference numeral 6 and the band 6 is provided with a buckle connection 7 for adjustment thereof. Secured upon opposite sides and to the inner surfaces of the nose and chin band 6 and extending forwardly therefrom are metallic side pieces 8 which have their rear ends extending rearwardly of the band 6 and the rear ends terminate in barrels 9 within which are journaled the forward straight portions of ring like members 10, while the side strap members 4 are secured to the rearward straight portions of the ring like members 10 as best shown in Figure 2.

The metallic side pieces 8 taper toward the forward ends and arranged adjacent to the forward ends and in each of the side pieces 8 are a plurality of openings 11 arranged whereby the openings of one side piece are aligned with the openings of the other side piece and whereby any pair of aligned openings is adapted to receive a cross rod 12 that is passed through the nostrils and the cartilage of an animal as shown in Figure 1. The cross rod is of course made from some non-corroding metal and is in the form of a bolt having threaded ends for receiving nuts, to secure the cross rod in the aligned openings, as shown.

Secured to the cross bar 12 is a substantially U-shaped member 13, through the medium of eyes 14 that are formed with the arms thereof, and of course the U-shaped member is pivotally mounted on the rod as will be apparent upon inspection of Figure 3. Arranged on the rod 12 between the side pieces 8 and eyes 14 are spacing sleeves 15 which hold the U-shaped member centralized on the rod. It will be apparent that the U-shaped member 13 is for the purpose of receiving a lead in the form of a chain or the like, not shown.

Secured upon the outer sides of the nose and chin band 6 and upon diametrically opposite sides thereof are side bars 16 which have their upper portions directed forwardly and laterally, while the lower portions are curved to provide what may be termed hook portions 17 that extend forward and laterally as it will be obvious that the lower portions of the side bars 16 are for the purpose of preventing the animal from jumping a barrier, due to the fact that the lower portions will come in contact therewith, if an attempt is made to do so.

In order to protect other animals and persons who may come in contact with the ends of the side bars 16, we have secured thereon balls 18 which act as guard means as will be apparent.

From the above description and disclosure of the drawing, it will be obvious that we have provided a restraining device that is primarily designed for vicious and unruly animals such as bulls, that is capable for use in leading the animal as well as to prevent it from jumping or going through a fence. In fact, should the animal attempt to run, the cross rod 12 will jerk its nose and thereby cause the animal to refrain from running, with the result the device will render the animal docile and allow it to be readily controlled, yet will not prevent breeding and will not hinder grazing.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A restraining device comprising a neckband, a nose and chin band, means of connection between the bands, side pieces extending forwardly from the nose and chin band, a cross rod adjustably associated with the forward portions of the side pieces and adapted to be passed through the nostrils and cartilage of an animal, lead receiving means secured to the cross rod, and side bars secured to the nose and chin band and having hooked lower portions.

2. An animal restraining device comprising a neckband, a nose and chin band, side pieces extending forwardly from the nose and chin band and having openings arranged in forward ends thereof, barrels formed on the rear ends of the side pieces, side members having connection with the barrels and neck band, adjusting means for the bands and side members, a cross rod adapted to be received in any pair of aligned openings of the side pieces for adjustment with respect thereto, a substantially U-shaped member secured to the cross rod, side bars secured upon diametrically opposite sides of the nose and chin band and extending above and below the same, and the lower portions of the side bars being arranged in substantially hook formation.

3. An animal restraining device comprising a neckband, a nose and chin band, side pieces secured to the inner surfaces and upon opposite sides of the nose band, said side pieces extending forwardly from the nose band and having a plurality of openings arranged in the forward portions thereof with the openings disposed in aligned pairs, barrels formed with the rear ends of the side pieces, side strap members having one of their ends secured to the neck band, means receiving the opposite ends of the side strap members for connecting them to the barrels, a cross rod adapted to be received in any aligned pair of openings for adjustably associating the same with respect to the side pieces, a substantially U-shaped member pivotally secured to the cross rod, centering means for the substantially U-shaped member, side bars secured to the nose and chin band upon diametrically opposite sides thereof, and having forwardly and laterally extending upper portions and substantially hook shaped forwardly and laterally arranged lower portions, and balls secured to the ends of the side bars.

CANUTE H. MICKELSEN.
JOSEPH T. EVANS.